April 6, 1965

F. G. McQUOWN 3,176,715

LOUVER TYPE DAMPER

Filed April 23, 1962

INVENTOR.
Francis Gordon McQuown
BY
Mann, Brown and McWilliam
Att'ys.

United States Patent Office 3,176,715
Patented Apr. 6, 1965

3,176,715
LOUVER TYPE DAMPER
Francis Gordon McQuown, Bloomington, Ill., assignor to American Foundry & Furnace Company, Bloomington, Ill., a corporation of Illinois
Filed Apr. 23, 1962, Ser. No. 189,489
1 Claim. (Cl. 137—601)

This invention relates to louver type damper units for installation within conventional air ducts for controlling air flow therethrough and more particularly is concerned with a louvered damper of the opposed blade type.

The principal objects of the invention are: to provide an improved multiple blade louvered type damper construction utilizing standardized parts readily adaptable to fit any size duct; to provide a louvered damper construction employing easy-to-assemble parts that may be engaged or disengaged without resort to welding, riveting, or screwing to facilitate field modification where required; to provide an improved opposed blade type of louvered damper utilizing a narrow blade configuration for close control of air flow; and to provide an improved opposed blade type of louvered damper utilizing blade end mountings comprised of interengaging gear type rotary bearings to eliminate blade end leakage paths and to provide uniform low-torque requirements.

Other objects and advantages will become apparent during the course of the following description.

In the accompanying drawings forming a part of this specification and in which like numerals are employed to designate like parts throughout the same;

FIG. 4 is a fragmentary elevational view of an assembled louvered blade and rotary bearing utilized in the damper unit of this invention;

FIG. 5 is a face or end view of a rotary bearing;

FIG. 6 is an end view of a louver blade;

FIG. 7 is a perspective view of a corner element utilized for securing the frame;

FIG. 8 is an enlarged detailed sectional view illustrating the engagement of the corner element within the duct and is taken on a line corresponding to that indicated at line 8—8 in FIG. 7;

FIG. 9 is a fragmentary perspective view of an extension type filler carried in a louver blade; and FIG. 10 is a fragmentary sectional view illustrating a support bracket and positioning shaft mechanism for driving a rotary bearing of one of the louver blades.

Figure 1:
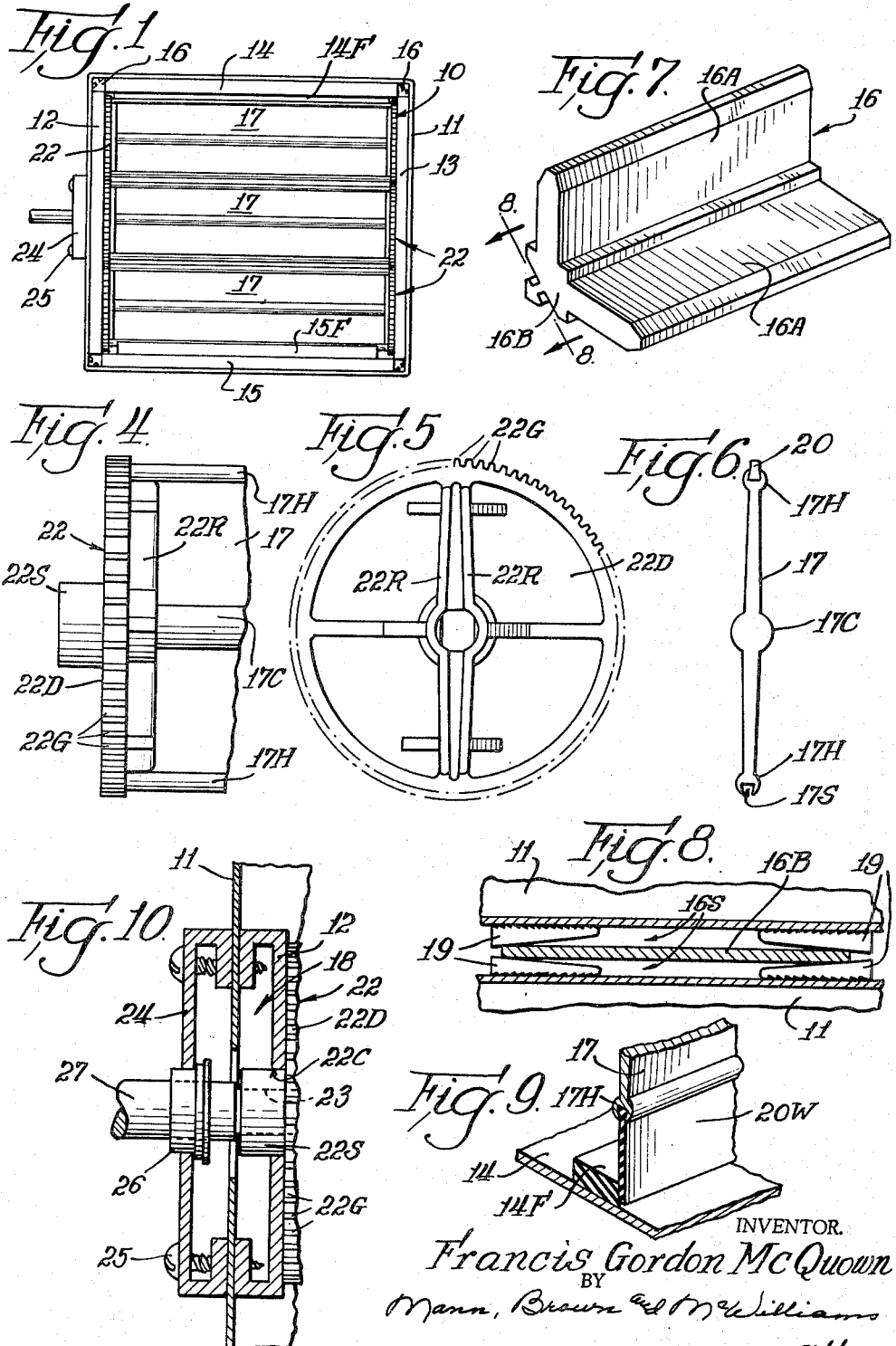
FIG. 1 is a front view of a multiple louver damper unit installed in an air duct, which is shown in section, the damper unit being shown with its louvers in closed position.
Figures 2, 3:
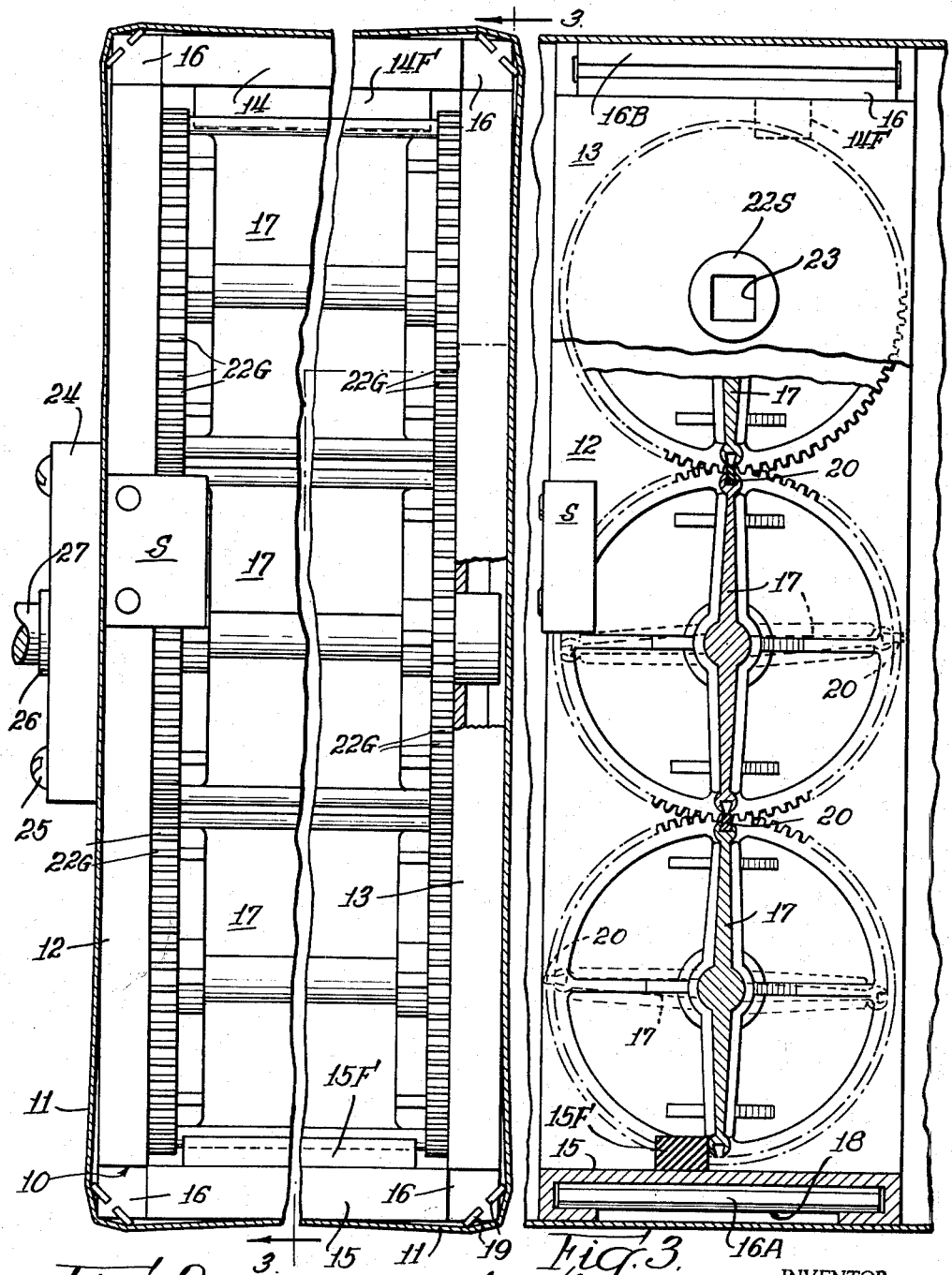
FIG. 2 is an enlarged front view of the damper unit with an intermediate portion of the width thereof broken away.
FIG. 3 is a vertical view partially in elevation and partially in section and is taken as indicated on the line 3—3 of FIG. 2.

The damper unit of this invention may be employed in any place and for any purpose for which it is suitable and may be made with any desired number of louvers, a three louver unit being shown herein in FIGS. 1, 2 and 3 for purposes of illustrative disclosure, and installed in a rectangular duct, which is indicated at 11, and may be, for example, a duct of a heating, ventilating, air conditioning system, or the like, through which air circulates and is controllable by the damper unit.

The louvers and operating mechanism therefore are mounted in a rectangular marginal frame 10 which fits crosswise within the duct 11 and is composed of a pair of correspondingly, transversely spaced upright side members 12 and 13, upper and lower end members 14 and 15, respectively, extending between the side members and a set of corner brackets 16 for interconnecting each set of adjacent ends of the frame members to complete the frame structure and define a central opening within which the three louvers 17 are located.

In accordance with this invention, the elements of the louver frame are of standardized uniform construction and are readily adaptable to fit any size duct and may be readily assembled into frame configuration without resort to welding, riveting, or screwing. These features facilitate field modification of the frame size where this is necessary. Towards this end, each of the frame members 12, 13 14 and 15 is of outwardly facing channel form and of identical size and configuration. More particularly, each of these members is preferably of a C-channel configuration to provide shallow channel ways 18 along the exterior face.

Each corner element 16 (FIG. 7) comprises a central generally rectangular corner boss 16B having side arms 16A projecting therefrom in right angular configuration for force fit wedging engagement within the adjacent channel ends for locking the frame elements together as a unitary structure. The corner boss of each corner element is provided with full length oblique coplanar slots 16S for receiving serrated anchoring wedges 19 (FIG. 8) that may be driven between the duct wall and the louver frame to fix the frame in installed position within the duct. When the frame is thus installed, the duct walls close off the open sides of the channel shaped framing members. The frame could also be installed by the use of conventional sheet metal screws.

The louvers 17 may be identical and each comprises a thin walled blade formed at its mid-width with a circular enlargement 17C extending from end-to-end thereof for reinforcement. Each louver blade also has an open edged hollow enlargement 17H extending from end-to-end along each of its opposite edges to provide a dovetail anchor slot 17S for a flexible seal strip 20 that is engageable with the adjacent edge of an adjoining louver blade when the blades are in their closed position. In the illustrated arrangement, sealing strips 14F and 15F extend along the inner faces of the end members 14 and 15, respectively, to engage and seal against the edge of the adjoining louver blade when the louver blades are in their closed position. As is illustrated herein, the lower louver blade is equipped with a seal strip 20 only along its upper blade edge and this seal strip may be made large enough to coact directly with the metal edge of the center louver blade. Therefore, the center louver blade may be equipped with a seal strip 20 only along its upper blade edge. The upper louver blade is equipped with a wide seal strip 20W along its upper blade edge to coact with the felt strip 14F. Where the duct height is such that the metal louver blades do not conveniently fill the entire duct passage, such differences are best handled by equipping one edge only of either the top louver blade or bottom louver blade or both with a widened filler strip of the required dimension.

It will be seen therefore that this frame and blade construction affords optimum standardization of parts. Preferably the louver blades 17, the framing elements 12 to 15, and the corner elements 16 are all aluminum extrusions and for each type of part, the individual pieces may be cut to length from the same extrusion in accordance with the sizing requirements of each application. The same type of louver blades are used in damper units of various height dimensions and where vertical clearance remains, large size filler strips 20W are employed.

Each louver blade 17 is preferably equipped at each end with an identical rotary bearing 22 journaled in a circular opening 22C in the main web of the corresponding side channel. Each rotary bearing 22 is preferably of molded plastic and includes a hollow axial bearing stub portion 22S rotatably journaled directly in the corresponding side member and a disc portion 22D having external peripheral gear teeth 22G disposed thereon and rotatable therewith in a plane directly alongside and inwardly of the side member. Each rotary bearing has corresponding inwardly projecting ribs 22R provided on its disc portion and defining a groove-like mounting socket of the same size and configuration as the blade end to accommodate direct mounting of each louver blade between an aligned pair of rotary bearings.

Each louver blade with its aligned pair of rotary bearings is spaced along the side frame channels so that when all the louver blades are in closed position, they completely span the open space within the louver frame. The disc portions of the rotary bearings are arranged with their gear teeth 22G in driving interengagement so that the discs completely fill end clearance spaces between the blades and the side frame channels 12 and 13 and thereby eliminate blade end leakage. Since the rotary bearings are arranged as inter-locking gears, all louver blades rotate simultaneously from the closed position illustrated in FIGS. 1 and 2, to the open position illustrated in dotted lines in FIG. 3. A stop S is fixed to channel 12 to engage the center louver blade 17 and thereby establish its fully open position.

Each louver blade 17 and rotary bearing 22 is preferabaly arranged symmetrically about its axis of rotation to permit these parts to move freely without unbalance between their open and closed positions. A uniform minimum operating torque characteristic is thereby provided in the damper unit of this invention. Moreover, the rotary bearings 22 may be of a lubric plastic material to substantially eliminate friction between the stationary frame and the rotating parts while maintaining close clearance for avoiding undesired end leakages. For stability, the axial bearing stub portion 22S of each rotary bearing may project slightly into the channel space and each is provided with an outwardly directed shaft receiving socket 23 of non-circular cross-sectional configuration.

All louvers are rotated simultaneously by a drive connected to one end of any selected louver and this may vary in accordance with the needs of each installation. A typical drive arrangement for this purpose is illustrated in FIGS. 1, 2 and 10 wherein an external support 24 that may be of channel-shape, is fitted to the exterior of the duct and secured in place by screws 25 or other suitable fasteners. The support is equipped with a plastic bearing stub 26 and a positioning shaft 27 projects through this stub into driving engagement in the socket of the rotary bearing.

The damper unit of this invention is initially assembled externally of the duct and in accordance with the duct sizing, the number of louver blades and the size of the filler strips for the end louvers may readily be determined after which the side channels are drilled to provide accurately located bearing openings. The louver blades may first be equipped with rotary bearings and then mounted in one side channel 12 which may previously have been fitted with corner elements 16. The other side channel 13 is similarly fitted with corner elements 16 and the end channels 14 and 15 are then fitted to the corner elements of one of the side channels. Thereafter, the parts are brought together to interengage the free rotary bearings with the side channel 13 and simultaneously to interengage the free corner elements with the free ends of the end channels.

The frame is then ready for installation within the duct and it is fixed in place therein by driving the serrated anchoring wedges 19 into the corner bosses 16B of the corner elements with the serrations engaging against the duct walls. The duct wall is thereafter drilled to provide an access opening for the positioning shaft 27 and its support plate 24 is fixed in centered position about this opening. The positioning shaft 27 may be engaged with any one of the rotary bearings for simultaneously rotating all of the louver blades. The direct interengaging gears 22 provide an opposed blade type of damper in that the adjoining blades rotate in opposite directions. This opposed blade arrangement gives better air control. Moreover, the louver blades 17 are of narrow streamline configuration and when in open position, occupy a minimum of space and present a minimum of resistance to airflow.

While I have shown and described my invention in a preferred form, I am aware that various changes and modifications may be made without departing from the principles of the invention, the scope of which is to be determined by the appended claim.

I claim:

In a louver type damper for use within an air duct, said damper being of a standardized construction that is custom suited in height and width in accordance with the height and width of said duct and comprising a frame having a pair of transversely spaced side members, each side member being a cut to length section in the form of an outwardly facing channel, rotary bearings mounted in said side members in aligned cooperating pairs and each comprising an axial bearing stub portion rotatably journaled in the corresponding side member and a disc portion having external peripheral gear teeth and rotatable in a plane inwardly of and alongside said corresponding side member, each bearing being provided with an inwardly directed socket, and a louver blade extending between each cooperating pair of bearings and being cut to length and of uniform cross-section from end to end and engaged in the sockets thereof to rotate in unison therewith, said bearings being spaced along said side members so that each disc has its gear teeth drivingly meshing with gear teeth of each adjacent disc and so that said blades, in one corresponding position thereof, completely close the space within said frame, and wherein each socket has an enlarged region of corresponding form at the axis of rotation of its bearing and each louver blade is an extrusion having an endwise extending enlargement which at each end mates with and interlocks in the enlarged region of its corresponding bearing socket.

References Cited by the Examiner
UNITED STATES PATENTS

| | | | |
|---|---|---|---|
| 182,075 | 9/76 | Jaqua. | |
| 1,496,055 | 6/24 | Jenkins. | |
| 1,695,768 | 12/28 | Kelly | 20—62 |
| 3,038,083 | 6/62 | Lunzer. | |
| 3,049,985 | 8/62 | Klingberg | 98—41 X |
| 3,084,715 | 4/63 | Scharres | 137—601 |

ISADOR WEIL, *Primary Examiner.*

WILLIAM F. O'DEA, *Examiner.*